United States Patent [19]

Manning et al.

[11] Patent Number: 4,793,477

[45] Date of Patent: Dec. 27, 1988

[54] BOOK CARRIER FOR CASSETTE AND COMPACT DISC

[76] Inventors: Larry F. Manning, 4706 Kester, Sherman Oaks, Calif. 91403; Theodore Tobias, 455 Martin La., Beverly Hills, Calif. 90210

[21] Appl. No.: 112,692

[22] Filed: Oct. 26, 1987

[51] Int. Cl.$^4$ .................... B65D 85/57; B65D 85/672
[52] U.S. Cl. .................................. 206/232; 206/387; 206/444
[58] Field of Search .................. 206/387, 444, 232

[56] References Cited

U.S. PATENT DOCUMENTS

| | | | |
|---|---|---|---|
| 4,084,690 | 4/1978 | Pulse | 206/444 X |
| 4,253,567 | 3/1981 | Goldammer | 206/387 |
| 4,341,307 | 7/1982 | Shyers | 206/387 |
| 4,518,275 | 5/1985 | Rauch, III et al. | 206/387 X |
| 4,566,590 | 1/1986 | Manning et al. | 206/387 X |
| 4,635,797 | 1/1987 | Bankier | 206/387 X |
| 4,702,369 | 10/1987 | Philosophe | 206/444 X |
| 4,717,021 | 1/1988 | Ditzig | 206/387 |
| 4,718,550 | 1/1988 | Johnson | 206/387 |

FOREIGN PATENT DOCUMENTS

| | | | |
|---|---|---|---|
| 3425579 | 1/1986 | Fed. Rep. of Germany | 206/387 |
| 3527506 | 2/1987 | Fed. Rep. of Germany | 206/387 |
| 2239186 | 2/1975 | France | 206/387 |
| 2503667 | 10/1982 | France | 206/387 |
| 2030545 | 4/1980 | United Kingdom | 206/387 |

Primary Examiner—William Price
Attorney, Agent, or Firm—Roger A. Marrs

[57] ABSTRACT

A storage container or folder is disclosed herein having an elongated rectangular backing sheet with squared corners and having a central strip defined by score lines midway between its opposite ends whereby the opposite ends may be folded over on the score lines to present the overall appearance of a conventional book. Front sheets are secured to the respective end portions of the backing sheets along the common exterior peripheral edges thereof leaving the opposing interior edges of the front sheets separated by the central strip open and available for insertably receiving a sheet of printed book title information. At least one storage pouch is carried on a selected one of the front sheets for releasably holding a magnetic tape cassette. The backing sheet and front sheets are composed of a pliable transparent material and the thickness of the pouch is substantially equal to the width of the central strip defined between the parallel spaced apart score lines.

1 Claim, 2 Drawing Sheets

BOOK CARRIER FOR CASSETTE AND COMPACT DISC

BACKGROUND OF THE INVENTION

1. Field of the Invention

The present invention relates to storage carriers or folders and more particularly to a novel such folder which when folded resembles a conventional book, and yet interiorly carries a cassette recording of a particular book and which includes pockets for holding printed literature pertaining to the book so that indicia on the literature is available for visual observation similar to a book cover.

2. Brief Description of the Prior Art

It has been the conventional practice to provide a variety of folders, carriers and covers for recorded messages in either printed or photographic form. These carriers or folders are intended to protect the recorded information and to serve as a storage device for the particular material being housed. A typical example resides in the album cover for a record or a folded over book jacket cover for printed subject matter.

Problems and difficulties have been encountered with such conventional storage carriers or folders which stem largely from the fact that the carriers are not intended to hold thick items such as cassettes or cartridges holding standard tape recordings. Also, means must be provided for holding the standard tape cartridges or cassettes on the carrier so they may be readily and easily inserted for storage and removed for usage. Another problem in conventional storage carriers resides in the fact that the external appearance of the entire carrier does not resemble a book and, therefore, the association with the tape recording on the cassette containing recorded book information is lost.

Therefore, a long standing need has existed to provide a novel folder or carrier which simulates the appearance of a book including display of book cover information, and which will readily house a tape recording of the book material in a manner which may be readily withdrawn for playback purposes.

SUMMARY OF THE INVENTION

Accordingly, the above problems and difficulties are obviated by the present invention which provides a novel carrier or folder for protecting and storing recorded information on a tape carried in a cartridge or cassette form which substantially comprises a rectangular backing sheet having opposite end portions which are covered by a pair of front sheets that are attached along their common peripheral edges maintaining the opposing edges of the front sheet separated in fixed spaced apart relationship and open in order to receive the opposite ends of a rectangular printed sheet containing indicia similar to the information jacket for a book. The recorded information on the tape is co-related or corresponds to the information on the printed sheet so that the user will identify the information on the tape by the printed information. A central strip is provided between the opposite ends of the backing sheet and integral therewith that is defined by a pair of parallel spaced apart score lines wherein each score line is immediately adjacent to the opening to a respective front sheet pocket whereby the opposite end portions of the backing sheet may be folded over upon itself to simulate a closed book. Indicia on the printed sheet appears through the transparent central strip of the backing sheet for observation by the user so as to identify the book recorded information. At least one raised pocket or pouch is carried on a selective one of the front sheets for removably storing a tape cassette or cartridge and means are integrally formed with the pouch or yieldably holding the cartridge in place. A feature of the invention resides in constructing the thickness of the pocket or pouch to be substantially equal to the width of the central strip so that the backing sheet portion may be readily folded over upon itself, resulting in the backing sheet end portion being substantially parallel to one another to accommodate the thickness of the cassette or cartridge.

Therefore, it is among the primary objects of the present invention to provide a novel transparent folder or carrier for a recorded tape cassette or cartridge which simulates a printed book when the covers are closed.

Another object of the present invention is to provide a novel carrier or folder for holding a tape cartridge or cassette containing recorded information for a particular book and which includes a sheet of printed indicia displaying the title, author and other book information thereon which is readily visible through the transparent material of the carrier or folder.

Still another object of the present invention is to provide a novel carrier or folder which will contain printed subject matter and tape recorded information pertaining to the same subject matter wherein when the carrier or folder is folded over upon itself, it will simulate a closed book with its book jacket available for visible observation by the user.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
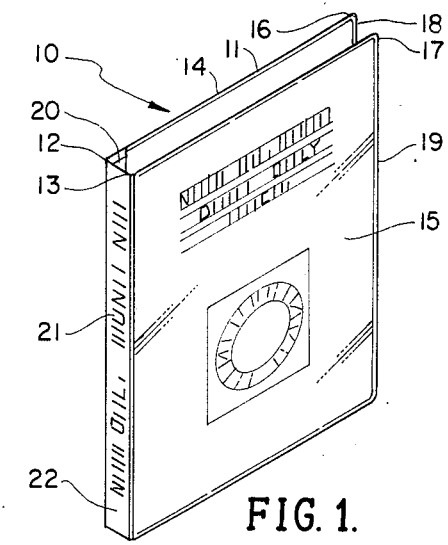
FIG. 1 is a front perspective view showing the novel folder or carrier of the present invention, simulating a book cover.

Referring to FIG. 1, the novel record holder of the present invention which may be defined as a folder or carrier is illustrated in the general direction of arrow 10 which includes an elongated, rectangular sheet of material forming a backing sheet identified by numeral 11 which is folded over upon itself about a pair of score lines indicated by numerals 12 and 13 respectively. The score lines are placed in fixed parallel spaced apart relationship on the interior surface of the backing sheet 11 and the score lines are spaced apart so that when the backing sheet is folded over about the score lines, the resultant article represents a book cover. This is further achieved by defining the backing sheet as having end portions 14 and 15 that terminate in square corners such as corners 16 and 17 that are aligned and adjacent to one another in spaced apart relationship. Alignment also occurs when the end portions 14 and 15 are folded over so that the terminating edges, such as edges 18 and 19, are further aligned to represent a simulated book cover closure.

A pliable sheet 20 is provided which is elongated and rectangular so as to lie immediately adjacent to the backing sheet 11. The sheet 20 is preferably of paper or cardboard and carries indicia, such as indicated by numeral 21, that will appear or be displayed through the central strip of the backing sheet defined between the score lines 12 and 13. The backing strip is indicated by numeral 22. Therefore, when the end portions 14 and 15 of the backing sheet 11 are folded over the score lines so that the opposite terminating ends of the respective end portions are aligned as well as the corners, a book cover is substantially simulated. The indicia displayed through the transparent material of the backing sheet further provides the illusion of a book cover. However, instead of a plurality of printed pages being carried between the end portions, it will be noticed in FIG. 2 that a pouch 25 is provided for receiving in slidable relationship, a standard tape cassette or cartridge 26.

Figure 2:
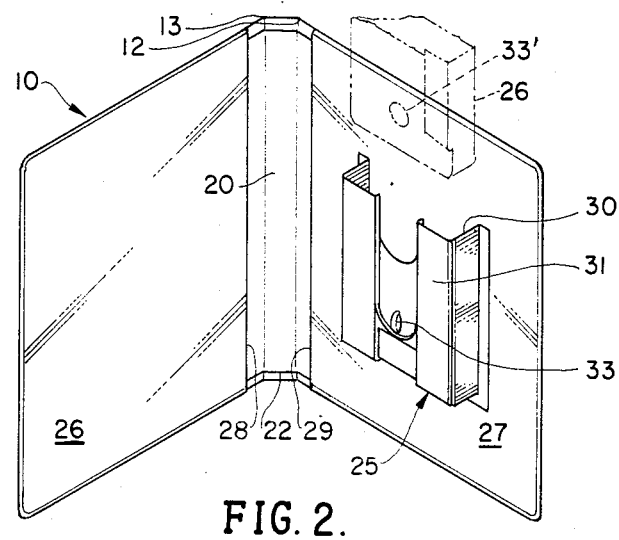
FIG. 2 is a perspective view of the folder or carrier opened to show the interior thereof.

Referring now in detail to FIG. 2, the pouch 25 is suitably carried on a surface of a selected one of a pair of front sheets indicated by numerals 26 and 27. The front sheets 26 and 27 are secured to the backing sheet along common peripheral edges by heat sealing, adhesive or other suitable means. However, it is to be particularly noted that opposing edges of the front sheets 26 and 27 are maintained open in order to provide an entrance into an area between the opposing surfaces of the front sheets and the backing sheet end portions. The edges defining the entrances are identified by numerals 28 and 29 and it is to be particularly noted that the opposite ends of the sheet 20 carrying the indicia are insertably positioned through the entrances and enter pockets defined by the front sheets and the end portions of the backing sheet. Once the sheet of material 20 has been so disposed, the indicia carried on the outer surface of the sheet will be displayed through the transparency of the backing sheet material. It is also within the inventive concept to include indicia on both sides of the sheet 20 so that display thereof can be through the front sheet 26, if desired. The sheet 20 may include score lines corresponding to the score lines 12 and 13 which will ease the fold-over of the end portions of the backing sheet when so manipulated.

The pouch 25 includes a raised sidewall 30 and a top panel 31. The sidewall 30 is of a thickness to accommodate the thickness of a conventional tape cassette or cartridge and it is an important feature of the invention that the width of the central strip 22 be of substantially equal thickness so that when the backing sheet is folded over upon itself, the pouch 25 serves as a separator between the end portions, resulting in the end portions lying substantially parallel with respect to one another in fixed spaced apart relationship. This feature again gives rise to the simulation of a conventional book cover with a plurality of pages between the covers.

Figure 3:
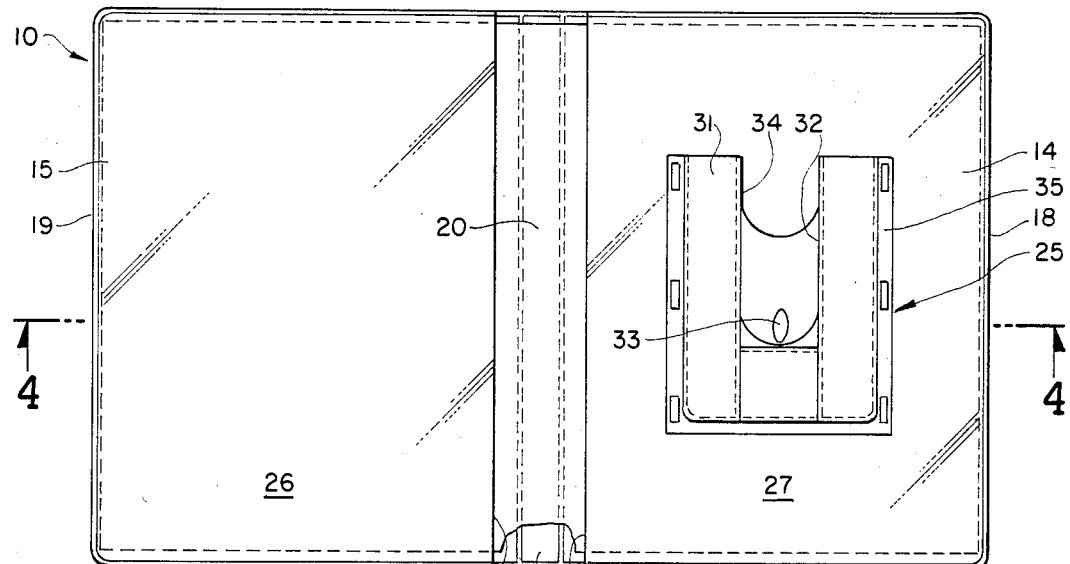
FIG. 3 is a plan view of the folder or carrier shown in FIGS. 1 and 2.
Figure 4:
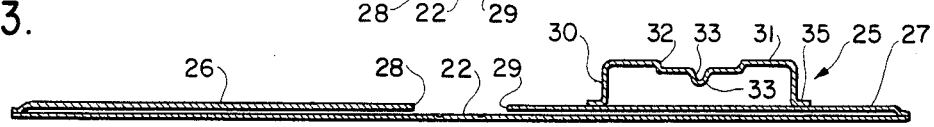
FIG. 4 is a longitudinal cross-sectional view of the folder or carrier illustrated in FIG. 3 as taken in the direction of arrows 4—4 thereof.

Referring now in detail to FIGS. 3 and 4, it can be seen that the pouch 25 not only includes a sidewall which is of substantially the thickness of a conventional tape cassette or cartridge, but includes a central elongated depression identified by numeral 32 which is conformal to the general outline or configuration of such a typical cassette or cartridge. Also, a typical cassette or cartridge includes at least one opening such as opening 33' in the cartridge 26 that is occupied by a yieldable projection 33 that downwardly depends from the top panel 31 of the pouch 25. The projection partially extends or projects into the cavity to be occupied by the cassette or cartridge and snap locks with the opening 33' to yieldably hold the cassette or cartridge in place within the pouch 25. Also, it should be noted that for convenience of removal or insertion of the cartridge, a cutout 34 is provided in the top panel 31 within the elongated groove or recess 32. Thus, the user's fingers can easily grasp the cassette or cartridge for insertion or removal. The sidewall 30 terminates in elongated strips, such as strip 35, for ready attachment to the surface of the front sheet 27.

Figure 5:
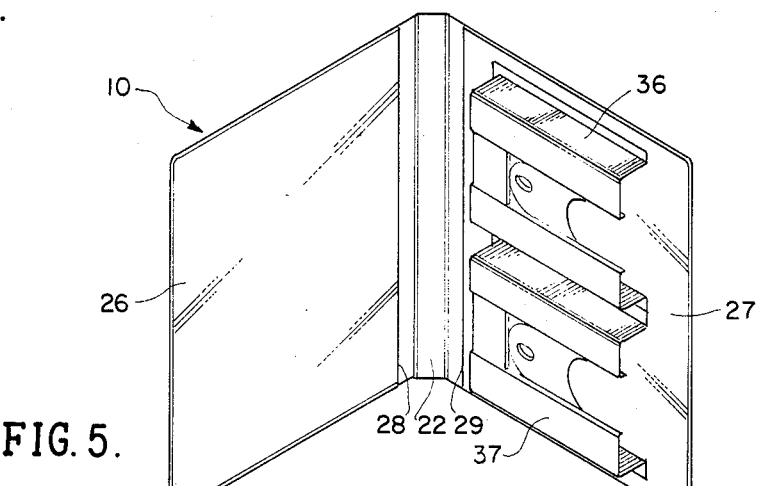
FIG. 5 is a perspective view of another embodiment or version of the present invention.

Referring now in detail to FIG. 5, another embodiment of the invention is illustrated wherein a pair of cassettes or cartridge pouches or holders are utilized. One pouch is indicated by numeral 36 while the other is indicated by numeral 37, and it is to be understood that the backing sheet, front sheets and pouches are identical, as previously described. However, in the embodiment of FIG. 5, the pouches 36 and 37 are arranged side by side in fixed spaced apart relationship laterally or transversely across the face of the front sheet 27 so that the entrances leading into the storage cavities of each pouch are entered laterally rather than from the top position as shown in FIG. 2. By this arrangement, a pair of cassettes or tapes representing an extremely long book or dissertation can be stored and accommodated. Orientation of the pouch as shown in FIGS. 2 and 3 permit storage of a single cassette or cartridge suitable for a certain length of tape play for a given length of book. The arrangement of pouches in FIG. 5 permits substantially longer book text to be stored on recorded tape and placed within the confines of a single folder or carrier representing the book recorded.

Therefore, in view of the foregoing, it can be seen that the folder or carrier of the present invention simulates a printed book with a plurality of pages between its covers. However, in place of the pages there is the storage pouch for the tape or cassette and the end portions of the folder or carrier are disposed in a typical book cover relationship so that simulation is complete. Likewise, the title of the book represented by the indicia 21 will be displayed through the transparent material on the central strip 22, as well as through the transparent material of the backing sheet forming end portions 14 and 15.

Figure 6:
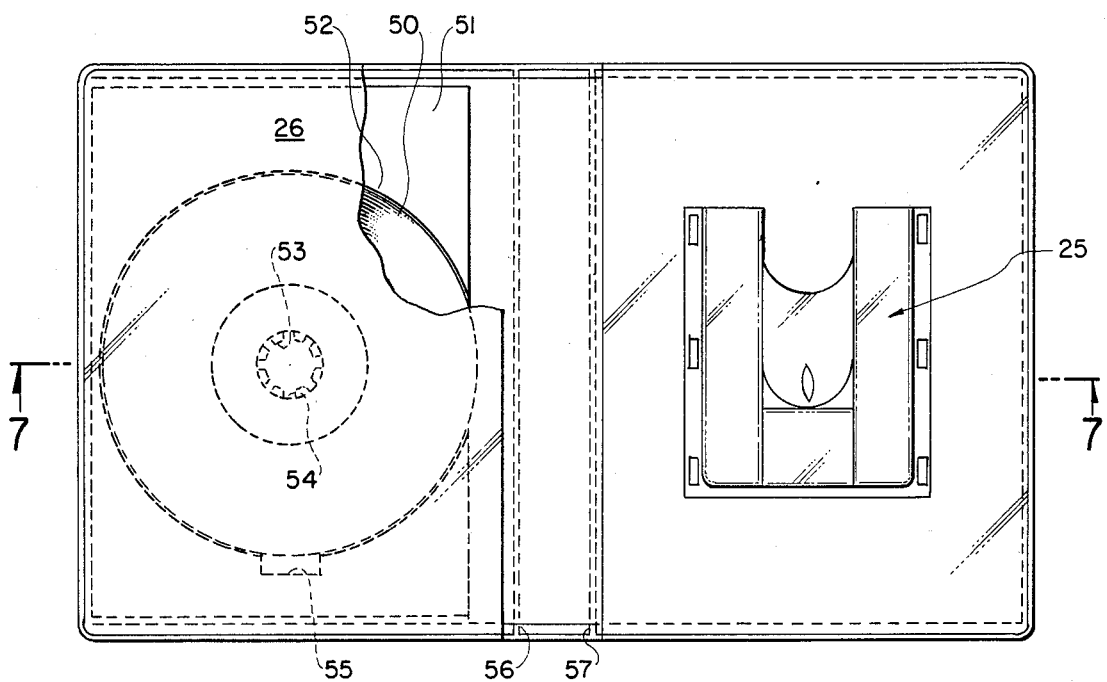
FIGS. 6 and 7 are plan and cross-sectional views of another version of the folder or carrier.
Figure 7:
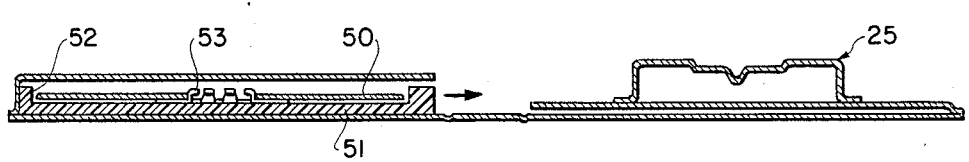

FIGS. 6 and 7 show another version of the invention for accommodating the storage or transport of small compact disc recordings in a folder by itself or with a cassette. The folder is the same as shown in FIGS. 3 and 4; however, the storage envelope defined by the opposing surfaces of the sheets 11 and 26 house a compact disc 50 in a slidable carrier 51. The disc is yieldably retained in a circular recess 52 by a plurality of spring fingers 53 projecting through a central opening 54 in the disc 50. When the carrier 51 is slid out of the envelope, the disc is exposed and the user's finger can be deployed into a notch 55 to effect disc removal.

The distance between fold or score lines 56 and 57 is substantially greater than in the previous version since the thickness of the carrier 51 with or without the thickness of the pouch 25 must be considered. The surrounding shoulder of the carrier 51 defining the recess 52 is sufficiently high to keep the upper surface of the disc from pressing against the undersurface of sheet 26. Such engagement would cause the undesirable effect of frictional sticking of the disc to the sheet.

The carrier slides freely into and out of the envelope through the elongated slit opening 28. Also, pictorial subject matter may be placed in the respective envelopes, as previously described.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A folder or carrier simulating a book cover for holding a tape cassette or cartridge comprising the combination of:
    an elongated rectangular backing sheet of transparent material having opposite end portions separated by an elongated flat central strip defined by parallel spaced apart score lines so that said backing sheet end portions fold over upon themselves about said respective score lines aligning the peripheral edges of said backing sheet end portions together to represent the cover of a book;
    a pair of front sheets carried against each of said backing sheet end portions secured to said peripheral edges thereof with unsecured edges opposing each other so as to constitute a pair of open pockets facing each other in opposing relationship;
    an elongated rectangular sheet of foldable material having indicia thereon visually displayed through said end portions and central strip of said backing sheet and further having opposite ends insertably disposed within said pair of pockets wherein said sheet of foldable material is conformal in shape and configuration with said backing sheet;
    an elongated pouch attached to one of said front sheets having an open end for slidably receiving said cassette or cartridge;
    said pouch having a rigid sidewall upstanding from said front sheet on which it is attached so that said pouch has a predetermined thickness;
    said central strip having a width substantially equal to said pouch sidewall thickness to separate said backing sheet end portions when folded over upon themselves so that said backing sheet end portion peripheral edges are aligned and conformal;
    said pouch having an open cavity for insertably receiving said cartridge or cassette;
    said pouch having a top sheet of material having its edge secured to the edge of said sidewall;
    said pouch top sheet configured to conform to the shape and configuration of said cassette or cartridge;
    a cantilevered protrusion carried on said top sheet projecting into said cavity for yieldable interference with said cassette or cartridge;
    each of said backing sheet end portions terminating their outer ends with squared corners;
    said squared corners of each end portion connected together by a straight edge;
    said end portion straight edges being arranged in parallel spaced apart relationship and in alignment when said end portions are folded over;
    a compact disc having recorded data on both sides thereof;
    a movable carrier releasably retaining said disc and slidably disposed within a selected one of said pockets adapted to pass through its elongated opening for access to said disc;
    said carrier substantially occupying said selected pocket to totally protect said compact disc;
    said carrier having a recess for storage of said disc and being of greater depth than the thickness of said disc so that an upper surface of said disc is in spaced-apart relationship with respect to said front sheet of said pocket; and
    resilient retention means mounted on said carrier for yieldably holding said disc on said carrier.

* * * * *